(12) United States Patent
Ishigaki (10) Patent No.: US 7,066,443 B2
(45) Date of Patent: Jun. 27, 2006

(54) GATE VALVE

(75) Inventor: Tsuneo Ishigaki, Yawara-mura (JP)

(73) Assignee: SMC Corporation, Tokyo (JP)

( * ) Notice: Subject to any disclaimer, the term of this patent is extended or adjusted under 35 U.S.C. 154(b) by 301 days.

(21) Appl. No.: 10/738,678

(22) Filed: Dec. 16, 2003

(65) Prior Publication Data

US 2004/0129910 A1 Jul. 8, 2004

(30) Foreign Application Priority Data

Dec. 16, 2002 (JP) ............................. 2002-363682

(51) Int. Cl.
*F16K 3/10* (2006.01)
(52) U.S. Cl. ...................................... 251/195; 251/203
(58) Field of Classification Search ................ 251/158, 251/193, 195, 203, 204
See application file for complete search history.

(56) References Cited

U.S. PATENT DOCUMENTS

| | | | | |
|---|---|---|---|---|
| 4,328,947 | A * | 5/1982 | Reimpell et al. | 251/167 |
| 5,626,324 | A * | 5/1997 | Nakamura et al. | 251/204 |
| 5,769,952 | A * | 6/1998 | Komino | 251/193 |
| 6,079,693 | A * | 6/2000 | Ettinger et al. | 251/195 |
| 6,082,706 | A * | 7/2000 | Irie | 251/158 |
| 6,390,448 | B1 | 5/2002 | Kroeker et al. | |
| 6,390,449 | B1 * | 5/2002 | Ishigaki et al. | 251/193 |
| 6,736,368 | B1 * | 5/2004 | Osawa et al. | 251/203 |

* cited by examiner

*Primary Examiner*—John Bastinelli
(74) *Attorney, Agent, or Firm*—Baker Botts L.L.P.

(57) ABSTRACT

A gate valve has a transfer chamber-side valve element and a process chamber-side valve element connected to a single shaft actuated with a single three-position air cylinder to selectively close a process chamber opening and a transfer chamber opening or fully open both the openings to allow an object to pass therethrough. A lever member is secured to the single shaft. A roller supported by the lever member is kept in engagement with a cam groove of a cam member. A cam support member for supporting the cam member is connected to the piston rod of the three-position air cylinder. A spring is interposed between the lever member and the cam support member. When the piston rod is in the first (lower extremity) position, both the transfer chamber-side valve element and the process chamber-side valve element fully open the transfer chamber opening and the process chamber opening, respectively. As the piston rod shifts from the first position to the second position, the roller shifts from engagement with an upper position of the cam groove to engagement with an intermediate position, causing the process chamber-side valve element to close the process chamber opening. As the piston rod shifts from the second position to the third (upper extremity) position, the roller shifts from the engagement with the intermediate position to engagement with a lower position of the cam groove, causing the transfer chamber-side valve element to close the transfer chamber opening.

3 Claims, 7 Drawing Sheets

GATE VALVE

BACKGROUND OF THE INVENTION

1. Field of the Invention

The present invention relates to a gate valve provided between vacuum chambers in a semiconductor manufacturing system, etc., e.g. between a process chamber (hereinafter referred to as "PC") and a transfer chamber (hereinafter referred to as "TC").

2. Description of the Related Art

A patent document 1 (U.S. Pat. No. 6,390,448) discloses a gate valve wherein mutually opposing walls of the gate valve body are formed with a PC (process chamber) opening and a TC (transfer chamber) opening, respectively, and the PC opening and the TC opening are selectively closed with a double-sided valve member having a PC-side valve element and a TC-side valve element. With the disclosed technique, for example, the TC opening is closed to keep the transfer chamber at a vacuum while the process chamber is opened to the atmosphere, thereby making it possible to carry out repairs in the process chamber while using the transfer chamber at a vacuum. Moreover, it is possible to replace the seal of the PC-side valve element in a state where the TC-side opening is closed with the TC-side valve element. It is also possible to prevent fragments, contaminants, etc. in the process chamber from entering the transfer chamber. Thus, it is possible to continue an operation in one vacuum chamber during the repair of the other vacuum chamber or during the repair of the valve element in the other vacuum chamber.

The gate valve in the patent document 1 tilts a single shaft at an upper position to allow the double-sided valve member to selectively close the PC opening and the TC opening and to place the double-sided valve member in an intermediate position between the two openings. When the single shaft is moved to a lower position, the two openings are fully open, thereby allowing a workpiece to pass therethrough. To perform these operations, the single shaft is secured to the double-sided valve member, and the single shaft is moved with three air cylinders. However, the use of three air cylinders causes an increase in size of the gate valve and also a rise in cost. Meanwhile, it is possible to clean the seal surfaces of the two walls of the valve body by removing the top cover from the valve body. However, it is impossible to replace the seals of the double-sided valve member. In addition, a space for cleaning is provided between each valve element and the associated wall, and the valve elements are coupled by using hinge pins. Thus, the spacing between the valve elements is large, and hence the longitudinal width of the valve body is unfavorably large.

SUMMARY OF THE INVENTION

A first object of the present invention is to provide a gate valve having a transfer chamber-side valve element and a process chamber-side valve element, wherein a single shaft is actuated with a single three-position air cylinder to selectively close a process chamber opening and a transfer chamber opening or fully open both the process chamber opening and the transfer chamber opening to allow an object to pass therethrough.

A second object of the present invention is to enable replacement of the seal of the process chamber- or transfer chamber-side valve element that is not closed when the process chamber opening or the transfer chamber opening is selectively closed.

To attain the above-described objects, the present invention is applied to a gate valve including a valve body having a transfer chamber opening and a process chamber opening formed in mutually opposing walls thereof, respectively. A transfer chamber-side valve element and a process chamber-side valve element that are connected to a single shaft are disposed in the valve body. The transfer chamber-side valve element and the process chamber-side valve element are controlled by actuation of the single shaft so that the transfer chamber-side valve element closes the transfer chamber opening, or the process chamber-side valve element closes the process chamber opening, or both the transfer chamber-side valve element and the process chamber-side valve element fully open the transfer chamber opening and the process chamber opening, respectively, to allow an object to pass therethrough.

According to a first arrangement of the present invention, a lever member is secured to the single shaft of the above-described gate valve, and a roller is supported by the lever member. The roller is kept in engagement with a cam groove of a cam member. The cam groove has a position A, a position B, and a position C. A cam support member for supporting the cam member is connected to a piston rod of a three-position air cylinder. The piston rod has a first position, a second position, and a third position. A spring is interposed between the lever member and the cam support member. When the piston rod is in the first position, the transfer chamber-side valve element and the process chamber-side valve element fully open the transfer chamber opening and the process chamber opening, respectively. As the piston rod shifts from the first position to the second position, the roller shifts from engagement with the position A of the cam groove to engagement with the position B. This shift causes the process chamber-side valve element to close the process chamber opening (in a state where the transfer chamber-side valve element opens the transfer chamber opening). As the piston rod shifts from the second position to the third position, the roller shifts from the engagement with the position B of the cam groove to engagement with the position C. This shift causes the transfer chamber-side valve element to close the transfer chamber opening (while the process chamber-side valve element opens the process chamber opening). It should be noted that two rollers may be supported on both lateral sides of the lever member and engaged in respective cam grooves of two cam members.

According to a second arrangement of the present invention, a pivot is connected to the lever member in the first arrangement, and a pivot-receiving groove is provided on the lower side of the valve body. When the roller shifts from the engagement with the position A of the cam groove to the engagement with the position B, and also when the roller shifts from the engagement with the position B of the cam groove to the engagement with the position C, the pivot engages with the pivot-receiving groove to serve as a supporting point for the shifting of the roller. The arrangement may be such that two pivots are connected to both lateral sides of the cam member, and two pivot-receiving grooves are provided on the lower side of the valve body.

According to a third arrangement of the present invention, a grooved plate is connected to the cam member in the first or second arrangement, and a bolt is threaded into the lever member. The shank of the bolt is positioned in a yoke groove of the grooved plate.

In addition, the present invention is applied to a gate valve including a valve body having a transfer chamber opening and a process chamber opening formed in mutually opposing walls thereof, respectively. A transfer chamber-side valve element and a process chamber-side valve element that are connected to a single shaft are disposed in the valve body. The transfer chamber-side valve element and the process chamber-side valve element are controlled by actuation of the single shaft so that the transfer chamber-side valve element closes the transfer chamber opening, or the process chamber-side valve element closes the process chamber opening, or both the transfer chamber-side valve element and the process chamber-side valve element fully open the transfer chamber opening and the process chamber opening, respectively, to allow an object to pass therethrough.

According to a fourth arrangement of the present invention, a rotary latch is pivotably supported on the inner surface of at least one of the process chamber-side valve element and the transfer chamber-side valve element of the above-described gate valve. The rotary latch has a latch surface at a forward end thereof. When a rotational force is applied to the rotary latch in one direction, the latch surface is pressed against a joint surface of the single shaft, whereby the at least one of the process chamber-side valve element and the transfer chamber-side valve element is latched to the single shaft. When a rotational force is applied to the rotary latch in a direction opposite to the one direction, the latch surface is separated from the joint surface of the single shaft to unlatch the at least one of the process chamber-side valve element and the transfer chamber-side valve element.

According to a fifth arrangement of the present invention, a rod support member is provided on the inner surface of the at least one of the process chamber-side valve element and the transfer chamber-side valve element in the fourth arrangement at a position above the rotary latch. The rod support member has an internal thread. A spring is interposed between the rod support member and a rear end portion of the rotary latch. The gate valve further includes a maintenance rod having an external thread. The external thread of the maintenance rod is engaged with the internal thread of the rod support member. A rotational force is applied to the rotary latch in the one direction by resilient force of the spring. A rotational force is applied to the rotary latch in the direction opposite to the one direction by advance of the distal end of the external thread of the maintenance rod.

According to a sixth arrangement of the present invention, the latch surface of the rotary latch and the joint surface of the single shaft in the fourth or fifth arrangement are slant surfaces as seen in a top view. The whole of the slant latch surface is joinable to the slant joint surface.

According to a seventh arrangement of the present invention, a shaft retaining member is formed on the inner surface of the at least one of the process chamber-side valve element and the transfer chamber-side valve element in any of the fourth to sixth arrangements. The shaft retaining member has a retaining surface formed at a distal end thereof. A second joint surface is formed on a side of the single shaft laterally opposite to the joint surface. The retaining surface of the shaft retaining member and the second joint surface of the single shaft are slant surfaces as seen in a top view. The whole of the slant retaining surface is joinable to the slant second joint surface.

According to an eighth arrangement of the present invention, a rod support member is provided above the rotary latch in the fourth arrangement. A latch screw is provided on the rod support member at a position above one of forward and rear end portions of the rotary latch. An unlatch screw is provided on the rod support member at a position above the other of the forward and rear end portions of the rotary latch. A rotational force is applied to the rotary latch in one direction by advance of the latch screw and retraction of the unlatch screw. A rotational force is applied to the rotary latch in a direction opposite to the one direction by retraction of the latch screw and advance of the unlatch screw.

According to a ninth arrangement of the present invention, the rod support member in the eighth arrangement is formed with two pairs of insertion holes and internal threads that are vertically adjacent to each other, respectively. The latch screw is engaged with one of the internal threads. The unlatch screw is engaged with the other of the internal threads. The latch screw and the unlatch screw have respective grooves (e.g. cone hexagon sockets) for engagement formed on their heads. The latch screw and the unlatch screw are rotatable with a tool by engaging its tip with the groove of each screw. It should be noted that the inner diameter of the each insertion hole may be smaller than the outer diameter of the associated screw.

According to a tenth arrangement of the present invention, the latch surface of the rotary latch and the joint surface of the single shaft in the eighth or ninth arrangement are slant surfaces as seen in a top view. The whole of the slant latch surface is joinable to the slant joint surface.

According to an eleventh arrangement of the present invention, a shaft retaining member is formed on the inner surface of the at least one of the process chamber-side valve element and the transfer chamber-side valve element in any of the eighth to tenth arrangements. The shaft retaining member has a retaining surface formed at a distal end thereof. A second joint surface is formed on a side of the single shaft laterally opposite to the joint surface. The retaining surface of the shaft retaining member and the second joint surface of the single shaft are slant surfaces as seen in a top view. The whole of the slant retaining surface is joinable to the slant second joint surface.

The gate valve according to any of the first to third arrangements has a transfer chamber-side valve element and a process chamber-side valve element and enables a process chamber opening and a transfer chamber opening to be selectively closed or fully opened to allow an object to pass therethrough by using a single three-position air cylinder. Therefore, the gate valve according to the present invention requires only one actuator and hence provides the following advantages ① and ② over the gate valve disclosed in the patent document 1:

① The number of component parts reduces, and reliability improves. In addition, costs reduce, and the length and breadth of the control body reduce.

② Signal and position detecting systems become simple. Therefore, reliability improves, and there will be no failure of the valve elements due to an error signal.

The gate valve according to any of the fourth to eleventh arrangements allows replacement of the seal of the process chamber- or transfer chamber-side valve element (at least one of these valve elements) that is not closed when the process chamber opening or the transfer chamber opening is selectively closed, by removing the valve element from the valve body. Therefore, the gate valve according to the present invention provides the following advantages (1) to (4) over the gate valve disclosed in the patent document 1:

(1) The gate valve according to the present invention uses the rotary latch and the shaft retaining member, which are thin in thickness, as means for securing the valve element to the single shaft. Therefore, there is no need of space for bolting and unbolting. Consequently, the spacing between the process chamber-side valve element and the transfer chamber-side valve element can be minimized. Thus, because the spacing between the process chamber-side seat surface and the transfer chamber-side seat surface can be reduced, the longitudinal width of the valve body can be minimized. In contrast to this, the gate valve of the patent document 1 has a large spacing between the two valve elements. The spacing between each valve element and the associated wall is also large. Accordingly, the longitudinal width of the valve body is unfavorably large.

(2) Attachment and detachment of the valve element can be done by actuating the maintenance rod partly inserted into the valve body. It is unnecessary for an operator to insert his/her hand into the valve body as in the case of bolting and unbolting the valve element. Therefore, there is no possibility that the interior of the valve body will be contaminated.

(3) To remove and replace the valve element, the latch is undone simply by threading the maintenance rod into the rod support member by hand or by retracting the latch screw and advancing the unlatch screw, and then the maintenance rod or the like is pulled up. By doing so, the valve element can be removed. A new valve element can be installed by reversing the procedure for removal. Therefore, the replacing operation can be facilitated and performed in a shortened period of time. Thus, the downtime of the system can be reduced to a considerable extent.

(4) Even if the gate valve operates accidentally during replacement of the valve element, there is no danger of the operator's hand being caught between the valve element and the seat surface.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 4A to 4C are views showing a first example of an arrangement for removing a process chamber- or transfer chamber-side valve element that is not closed when a process chamber opening or a transfer chamber opening is selectively closed, of which.

FIGS. 7A to 7C are views showing a second example of an arrangement for removing a process chamber- or transfer chamber-side valve element that is not closed when a process chamber opening or a transfer chamber opening is selectively closed, of which.

DETAILED DESCRIPTION OF THE PREFERRED EMBODIMENTS

Figure 1A:
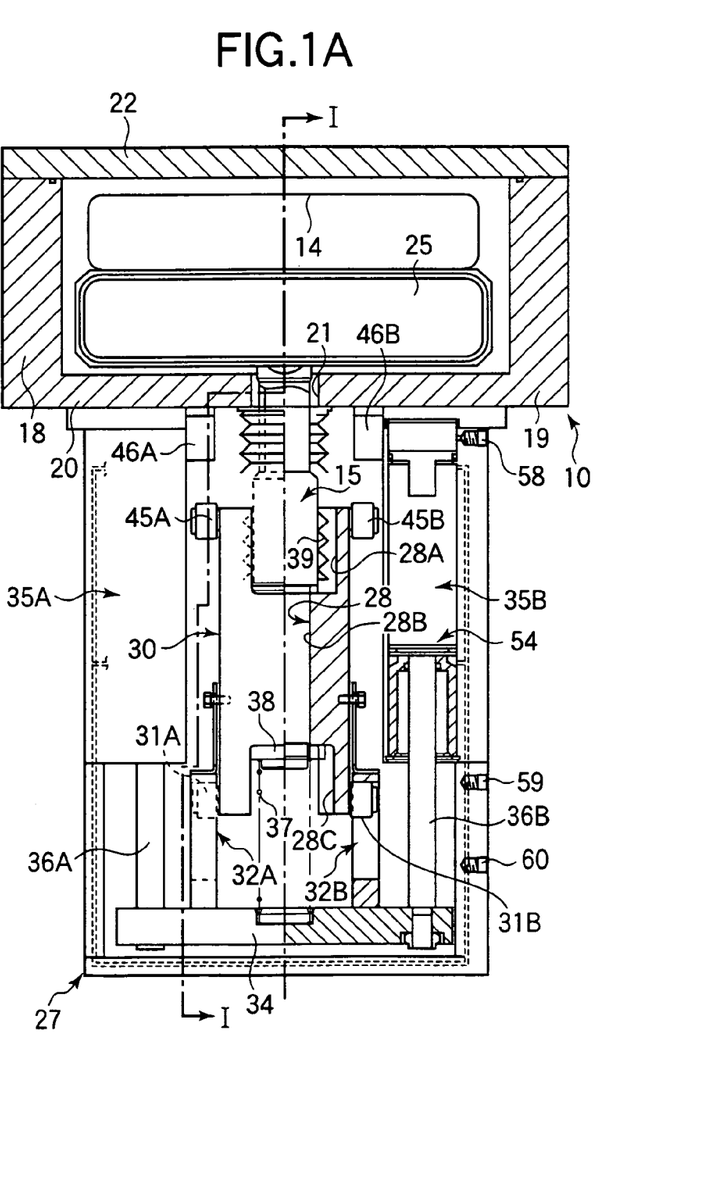
FIG. 1A is a partly-sectioned front view of an embodiment of the gate valve according to the present invention (in a first position).

FIGS. 1A to 7C show embodiments of the gate valve according to the present invention. FIGS. 1A to 3 show a structure for vertically moving and tilting a single shaft 15. As shown in FIGS. 1A and 1B, a gate valve has a valve body 10 comprising a front wall 11, a rear wall 12, a left wall 18, a right wall 19, and a bottom wall 20. A bonnet (cover) 22 is secured to the upper side of the valve body 10. A control body 27 is connected to the lower side of the valve body 10. The gate valve has a TC (transfer chamber) opening 13 in the front wall 11 of the valve body 10 and a PC (process chamber) opening 14 in the rear wall 12. A TC-side valve element 25 and a PC-side valve element 26 are connected to an upper portion 15A of a single shaft 15. The TC-side valve element 25 and the PC-side valve element 26 are disposed in the valve body 10. The upper portion 15A of the single shaft 15 is inserted into an insertion hole 21 in the bottom wall 20. The single shaft 15 extends into the control body 27. In response to the actuation of the single shaft 15, a seal 63 of the TC-side valve element 25 presses against a TC-side seal surface 23 to close the TC opening 13, or a seal 64 of the PC-side valve element 26 presses against a PC-side seal surface 24 to close the PC opening 14, or the TC-side valve element 25 and the PC-side valve element 26 are moved downward to fully open both the openings 13 and 14, thereby allowing an object (workpiece) to pass therethrough.

Figure 1B:
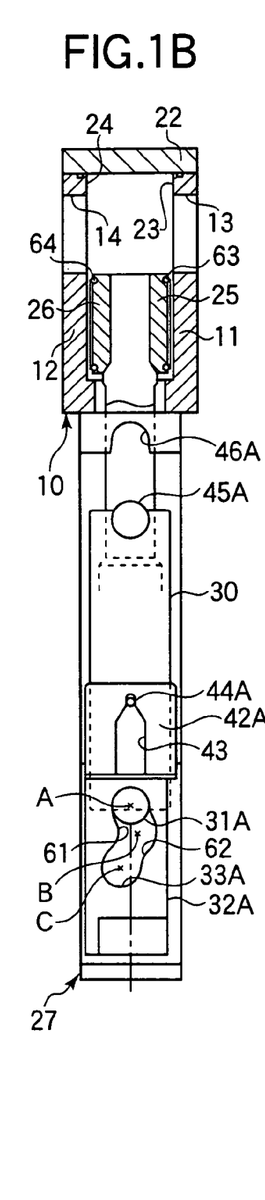
FIG. 1B is a sectional side view of the embodiment taken along the line I—I in FIG. 1A.
Figure 2A:
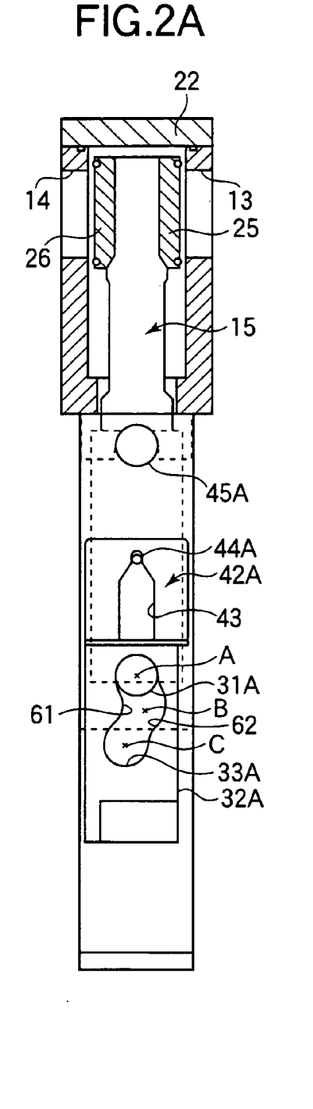
FIG. 2A is a sectional side view of the embodiment in a state where a piston rod is in an intermediate position.
Figure 2B:
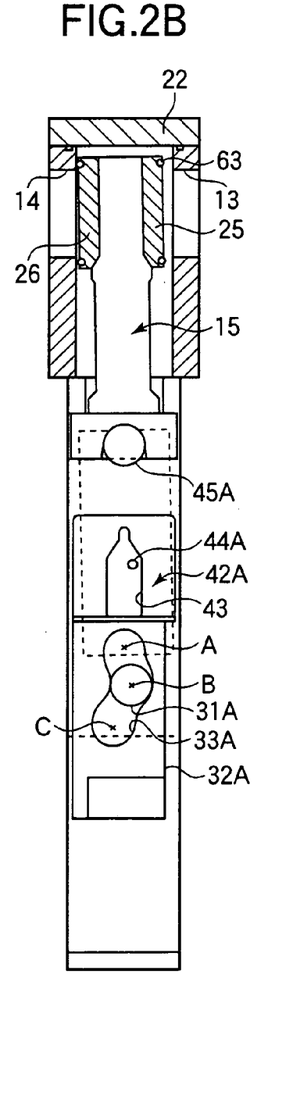
FIG. 2B is a sectional side view of the embodiment in a state where the piston rod is in a second position.
Figure 2C:
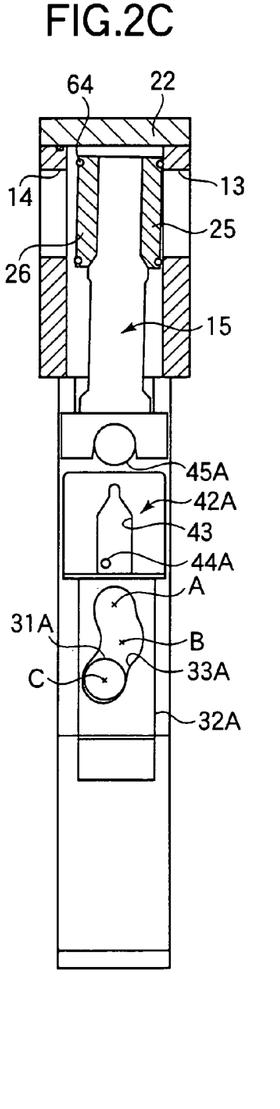
FIG. 2C is a sectional side view of the embodiment in a state where the piston rod is in a third position.
Figure 3:
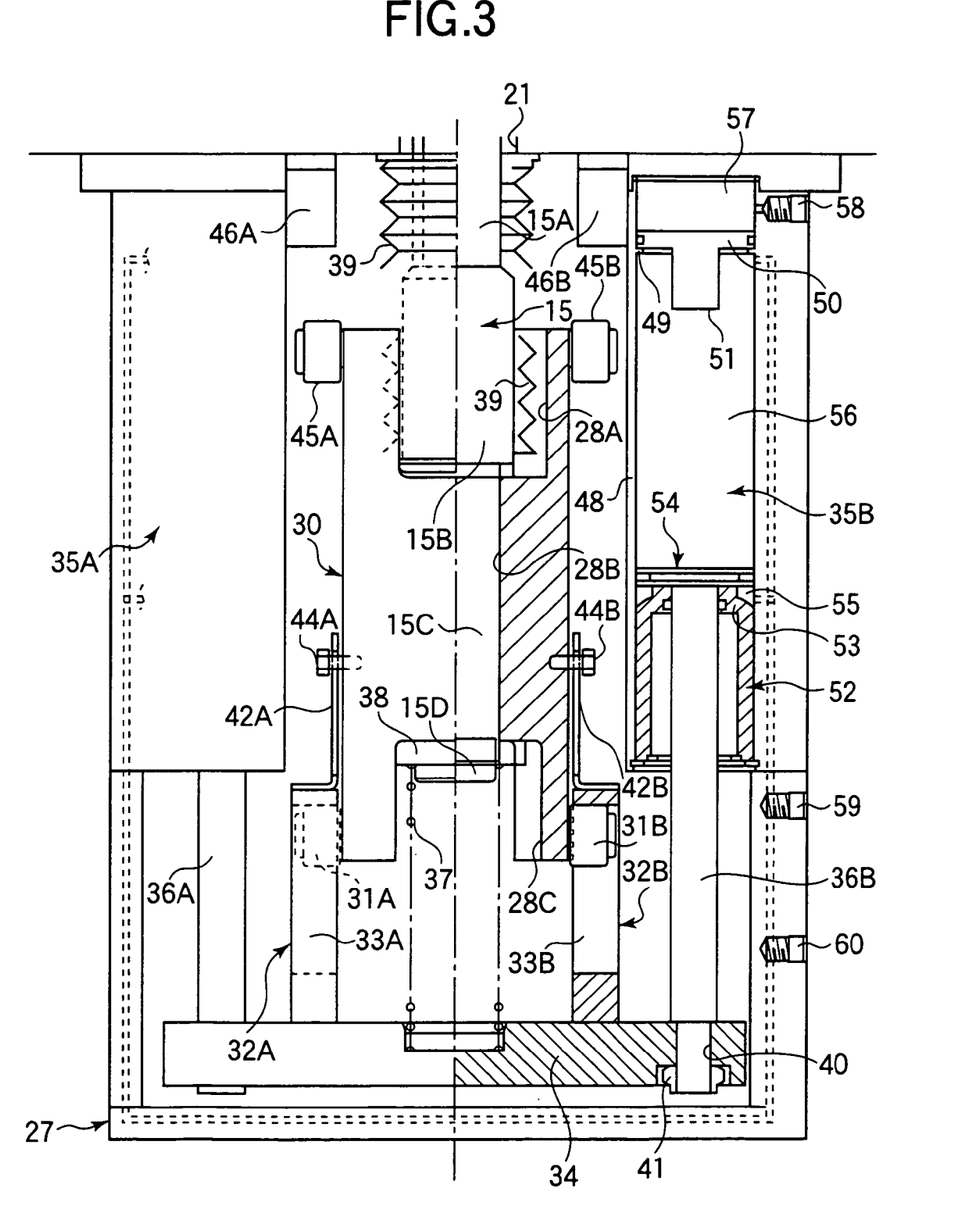
FIG. 3 is an enlarged view of an essential part of FIG. 1A.
Figure 4A:
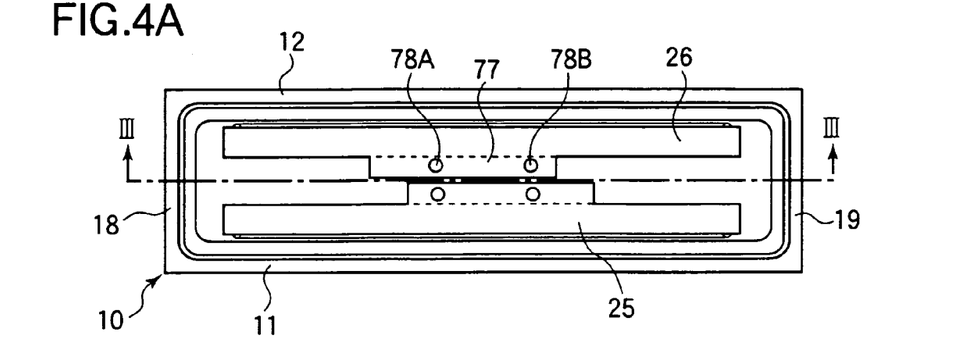
FIG. 4A is a plan view showing the arrangement in a state where a bonnet is detached.
Figure 4B:
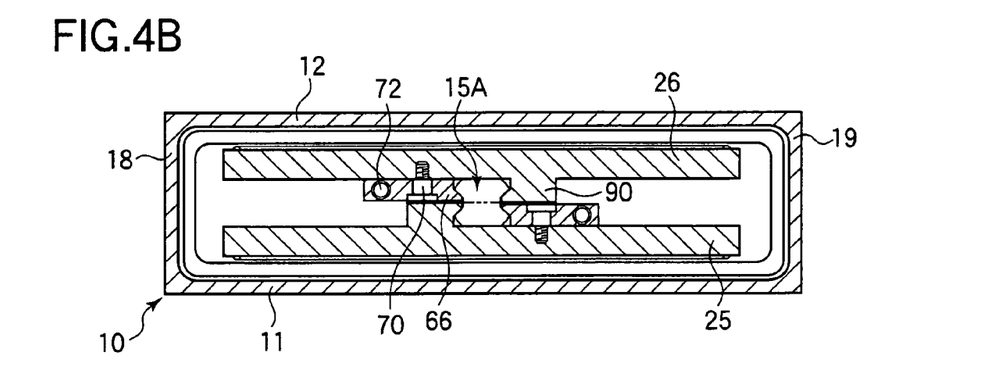
FIG. 4B is a sectional view taken along the line II—II in FIG. 4C.
Figure 4C:
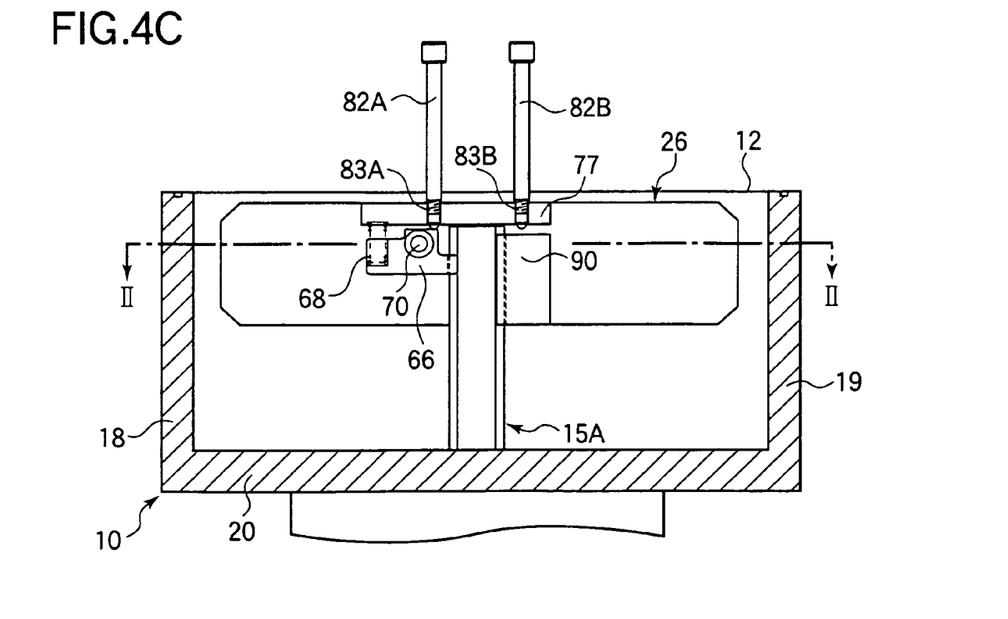
FIG. 4C is a sectional side view taken along the line III—III in FIG. 4A, showing a latched state.

A lever member 30 is secured to the single shaft 15. Two rollers 31A and 31B are supported on both sides of the lower end of the lever member 30. The rollers 31A and 31B are kept in engagement with respective cam grooves 33A and 33B of two cam members 32A and 32B. The cam members 32A and 32B are supported by a cam support member 34. Both end portions of the cam support member 34 are connected to respective piston rods 36A and 36B of three-position air cylinders 35A and 35B. A spring 37 is interposed between the lever member 30 and the cam support member 34. The TC opening 13 is communicated with a TC (transfer chamber) through a passage (not shown). The PC opening 14 is communicated with a PC (process chamber) through a passage (not shown).

The single shaft 15 has, in order from the upper side thereof, an upper portion 15A, an enlarged portion 15B, a lower portion 15C, and an external thread 15D. A stepped insertion bore 28 in the lever member 30 has an upper large-diameter portion 28A, an intermediate-diameter portion 28B, and a lower large-diameter portion 28C. The lower portion 15C of the single shaft 15 is inserted in the intermediate-diameter portion 28B of the stepped insertion bore 28. A nut 38 is engaged with the external thread 15D of the single shaft 15. The lower end of the enlarged portion 15B of the single shaft 15 is in contact with a step portion of the upper large-diameter portion 28A of the stepped insertion bore 28. The upper end of a bellows 39 is sealingly secured to the periphery of the insertion hole 21 in the bottom of the valve body 10. The lower end of the bellows 39 is sealingly secured to the outer peripheral surface of the lower end of the enlarged portion 15B of the single shaft 15.

The two three-position air cylinders 35A and 35B are secured to respective upper positions in the left and right end portions of the control body 27. External threads on the distal ends of the two piston rods 36A and 36B of the air cylinders 35A and 35B are inserted into respective insertion holes 40 provided in the left and right end portions of the cam support member 34. Nuts 41 are engaged with the external threads to secure the piston rods 36A and 36B to the cam support member 34. Grooved plates 42A and 42B are connected to the respective upper ends of the cam members 32A and 32B. Bolts 44A and 44B are threaded into both sides of the lever member 30. The shanks of the bolts 44A and 44B are positioned in respective yoke grooves 43 of the grooved plates 42A and 42B. Pivots (rollers) 45A and 45B are connected to both sides of the upper end portion of the lever member 30. Pivot-receiving grooves 46A and 46B are provided on the lower side of the valve body 10. When moved upward, the pivots 45A and 45B engage with the pivot-receiving grooves 46A and 46B, respectively.

The three-position air cylinders 35A and 35B each have a cylinder tube 48. An annular collar 49 is formed at an upper position on the inner wall of the cylinder tube 48. A stop piston 50 is slidably disposed in the cylinder tube 48 above the annular collar 49. The lower side of the stop piston 50 is formed with a stopper 51 projecting downward. An approximately cylindrical recirculating linear ball bearing 52 is hermetically disposed at a lower position inside the cylinder tube 48. A flange 53 is formed at the upper end of the recirculating linear ball bearing 52. A piston 54 is slidably disposed in the cylinder tube 48 so as to be movable between the flange 53 and the annular collar 49. The piston rod 36A (36B) of the piston 54 is slidably and hermetically supported by a center hole of the flange 53. The piston rod 36A is reciprocatably supported by the recirculating linear ball bearing 52. Thus, a load acting perpendicularly on the piston rod 36A is borne.

A first cylinder chamber 55 is formed between the flange 53 and the piston 54 in each of the three-position air cylinders 35A and 35B. A second cylinder chamber 56 is formed between the piston 54 and the stop piston 50. A third cylinder chamber 57 is formed between the stop piston 50 and an upper end plate. A side wall of the control body 27 has, in order from the upper side thereof, a stopper port 58, an open port 59 and a close port 60. These ports are formed in an open state. The stopper port 58, the open port 59 and the close port 60 are respectively communicated with the upper part of the third cylinder chamber 57, the upper part of the second cylinder chamber 56 and the lower part of the first cylinder chamber 55 of each of the three-position air cylinders 35A and 35B through respective passages (not shown).

Next, the operation of the single shaft 15 will be described. The piston rods 36A and 36B each have three positions, i.e. a first position, a second position, and a third position. When the stopper port 58 and the open port 59 are communicated with a compressed air pressure source while the close port 60 is communicated with the atmosphere, the piston rods 36A and 36B are placed in a first position (lower extremity position) shown in FIG. 1. When the piston rods 36A and 36B are in the first position, the TC-side valve element 25 and the PC-side valve element 26 are placed in a fully open position. At this time, a workpiece can freely pass through the TC opening 13 and the PC opening 14. Thus, loading and unloading of the workpiece into and from the process chamber are performed. As shown in FIG. 1B, the cam groove 33A (33B) is in the shape of ">" and has three positions, i.e. position A (upper end position), position B (intermediate position), and position C (lower end position), in order from the upper side thereof. The position A (upper end position) is located in the lateral center of the cam groove 33A (33B). The position B (intermediate position) is located rightward of the lateral center. The position C (lower end position) is located leftward of the lateral center. In the first position, the rollers 31A and 31B are engaged with the respective upper end positions of the cam grooves 33A and 33B. Meanwhile, the yoke grooves 43 are in the shape of a combination of a triangle and a rectangle connected in series vertically. Each yoke groove 43 has a recess at the upper end thereof. The recess has a size just large enough for the shank of the bolt 44A (44B) to engage therein. In the first position, the shanks of the bolts 44A and 44B are located at the respective upper end positions (recesses) in the yoke grooves 43A and 43B of the grooved plates 42A and 42B.

Next, when the close port 60 and the stopper port 58 are communicated with the compressed air pressure source while the open port 59 is communicated with the atmosphere, each piston 54 begins to move upward, and the piston rods 36A and 36B, which are connected to the respective pistons 54, together with the cam support member 34 and the cam members 32A and 32B, move upward simultaneously with the pistons 54. The upward movement of the cam support member 34 is transmitted to the lever member 30 through the spring 37. Consequently, the single shaft 15, which is connected to the lever member 30, together with the TC-side valve element 25 and the PC-side valve element 26, moves upward simultaneously with the lever member 30. When the pivots 45A and 45B engage in the respective pivot-receiving grooves 46A and 46B as a result of the upward movement of the lever member 30, the lever member 30 stops moving upward, thus reaching an intermediate position (between the first position and the second position) shown in FIG. 2A. The TC-side valve element 25 and the PC-side valve element 26 half open the TC opening 13 and the PC opening 14, respectively. In this position, a fluid can pass through the TC opening 13 and the PC opening 14, but a workpiece cannot pass therethrough. In the intermediate position, the rollers 31A and 31B remain engaged in the positions A of the cam grooves 33A and 33B, and the shanks of the bolts 44A and 44B remain located at the upper end positions in the yoke grooves 43A and 43B of the grooved plates 42A and 42B.

Despite the termination of the upward movement of the lever member 30 in the intermediate position, the cam members 32A and 32B continue moving upward, causing the spring 37 to be compressed. Thus, the roller 31A (31B) is pushed by a first cam 61 (see FIG. 2A) at the left side of the cam groove 33A (33B). As a result, the roller 31A (31B) shifts from the engagement with the position A to the engagement with the position B. Consequently, the single shaft 15 and the lever member 30 begin to pivot counterclockwise (left-handed direction) as viewed in FIGS. 2A and 2B about the pivots 45A and 45B. When the piston 54 abuts on the stopper 51 in the lowered position, the upward movement of the piston 54 stops. Thus, the piston rods 36A and 36B reach the second position shown in FIG. 2B. It should be noted that the pressure-receiving area at the upper side of the stop piston 50 is larger than the pressure-receiving area at the lower side of the piston 54. Therefore, the stop piston 50 can stop the upward movement of the piston 54. To make the stopping operation even more reliable, however, the diameter of the third cylinder chamber 57 and the diameter of the stop piston 50 may be further increased. In response to the shift of the piston rods 36A and 36B from the intermediate position to the second position, the rollers 31A and 31B shift from the engagement with the position A to engagement with the position B. As a result of the shifting of the rollers 31A and 31B, the PC-side valve element 26 closes the PC opening 14. In this second position, a semiconductor workpiece is processed in the process chamber. It should be noted that in the second position shown in FIG. 2B, the shank of the bolt 44A is at a position closer to the upper end of the yoke groove 43 and rightward of the lateral center of the yoke groove 43.

Usually, after the semiconductor workpiece has been processed in the second position, the piston 54 is returned to the first position to unload the processed semiconductor workpiece. Then, a workpiece to be processed is loaded, and the piston 54 is moved to the second position. However, when the process chamber needs repairs or it is desired to replace the seal 64 of the PC-side valve element 26, the close port 60 is communicated with the compressed air pressure source while the open port 59 and the stopper port 58 are communicated with the atmosphere. Consequently, the piston 54 further moves upward, pushing up the stopper 51, and the piston rods 36A and 36B move from the second position in FIG. 2B to the third position (upper extremity position) shown in FIG. 2C. In response to the shift of the piston rods 36A and 36B from the second position to the third position, the rollers 31A and 31B shift from the engagement with the position B to engagement with the position C. In the process of this shift, a second cam 62 (see FIG. 2A) pushes the roller 31A (31B), causing the single shaft 15 and the lever member 30 to begin pivoting clockwise (right-handed direction) as viewed in FIGS. 2B and 2C about the pivots 45A and 45B. This pivoting motion causes the PC-side valve element 26 to move to a half-open position. Thus, the PC opening 14 is half opened. At the same time, the pivoting motion causes the TC-side valve element 25 to close the TC opening 13. It should be noted that in the third position shown in FIG. 2C, the shank of the bolt 44A is at a position closer to the lower end of the yoke groove 43 and leftward of the lateral center of the yoke groove 43.

The following is a description of a first example of an arrangement for removing the PC- or TC-side valve element that is not closed when the PC opening 14 or the TC opening 13 is selectively closed, to replace the seal of the valve element, and for reinstalling the valve element after the replacement. The description will be made with reference to FIGS. 4A to 6B. A rotary latch 66 is rotatably supported on the inner surface of at least one of the PC-side valve element 26 and the TC-side valve element 25 (i.e. at least one of the mutually opposing surfaces of the valve element 25 and 26 in FIGS. 4A and 4B). The rotary latch 66 has a latch surface 67 formed at a forward end thereof (right end in FIG. 5A). The following arrangement is common to the first example and a second example described later. That is, when a rotational force is applied to the rotary latch 66 in one direction, the latch surface 67 is pressed against a joint surface 73 of the single shaft (upper portion) 15A. Thus, the valve element is latched to the single shaft 15A. When a rotational force is applied to the rotary latch 66 in a direction opposite to the one direction, the latch surface 67 is separated from the joint surface 73 of the single shaft 15A to unlatch the valve element. In the first example, the rotary latch 66 is pivoted in one direction by resilient force of a spring 68. Thus, the rotary latch 66 is urged to press the latch surface 67 against the joint surface 73 of the single shaft 15A, thereby allowing the valve element to be latched to a predetermined position. A rod support member 77 is provided on the inner surface of the valve element. The rod support member 77 has an internal thread 78A extending therethrough vertically. An external thread 83A of a maintenance rod (rod for attachment and detachment) 82A is engaged with the internal thread 78A. The rotary latch 66 is pivoted in a direction opposite to the one direction by the advance of the distal end 84A of the external thread 83A of the maintenance rod 82A. As a result, the latch surface 67 is separated from the joint surface 73, and hence the valve element is unlatched.

In FIGS. 4A to 6B, both the PC-side valve element 26 and the TC-side valve element 25 are provided with the arrangement for replacing seals. The following description is, however, centered on the arrangement provided for the PC-side valve element 26. FIGS. 5A to 5B show the PC-side valve element 26 in the latched state. The bonnet 22 has been removed from the top of the valve body 10. The rod support member 77 is provided on the inner surface of the PC-side valve element 26 at a position where the upper end surface of the rod support member 77 and the upper end surface of the PC-side valve element 26 are coincident with each other. The rod support member 77 may be integrated with the PC-side valve element 26. Alternatively, the rod support member 77 may be prepared as a member separate from the PC-side valve element 26 and secured to the latter with bolts, nuts, etc. The upper end of the single shaft 15A is positioned in close proximity to the lower side of the rod support member 77. The rotary latch 66 is disposed at the left side of the single shaft 15A at a position below and somewhat away from the rod support member 77. At the right side of the single shaft 15A, a shaft retaining member 90 is provided on the PC-side valve element 26 at a position below and away from the rod support member 77.

The rotary latch 66 has a stepped insertion hole 69 at an upper and approximately central position in the lateral direction thereof. A rotating shaft 70 is inserted in the stepped insertion hole 69. The PC-side valve element 26 has an internal thread 71 formed in the inner side thereof. An external thread formed on the distal end of the rotating shaft 70 is engaged with the internal thread 71. The rotary latch 66 has a lower spring seat 72 formed on the rear end portion (left end portion in FIG. 5B) thereof. The upper end of the lower spring seat 72 is open. The rod support member 77 has an upper spring seat 79 formed on the lower and left end portion thereof. The spring 68 is interposed between the lower spring seat 72 and the upper spring seat 79. The rotary latch 66 is urged in the counterclockwise direction (one direction) by the resilient force of the spring 68. As seen in a top view, e.g. FIG. 5A, the latch surface 67 of the rotary latch 66 and the joint surface 73 of the single shaft 15A are slant surfaces. The whole of the slant latch surface 67 is joinable to the slant joint surface 73.

The shaft retaining member 90 is formed on the inner surface of the PC-side valve element 26. The shaft retaining member 90 may be integral with the PC-side valve element 26 as shown in the drawings. Alternatively, the shaft retaining member 90 may be prepared as a member separate from the PC-side valve element 26 and secured to the latter with bolts, nuts, etc. The shaft retaining member 90 has a retaining surface 91 at the distal end thereof. A second joint surface 74 is formed on a side of the single shaft 15A laterally opposite to the joint surface 73. As seen in a top view, e.g. FIG. 5A, the retaining surface 91 of the shaft retaining member 90 and the second joint surface 74 of the single shaft 15A are slant surfaces. The whole of the slant retaining surface 91 is joinable to the second joint surface 74. In the latched state shown in FIGS. 4A to 5B, the whole latch surface 67 presses the joint surface 73 with the resilient force of the spring 68. Counterforce produced at this time is transmitted to the retaining surface 91 through the rotary latch 66, the rotating shaft 70, the PC-side valve element 26 and the shaft retaining member 90. Accordingly, the whole retaining surface 91 presses the second joint surface 74. Thus, the single shaft 15A is clamped with the latch surface 67 and the retaining surface 91 from both the left and right sides. Hence, latching is surely performed.

Figure 5A:
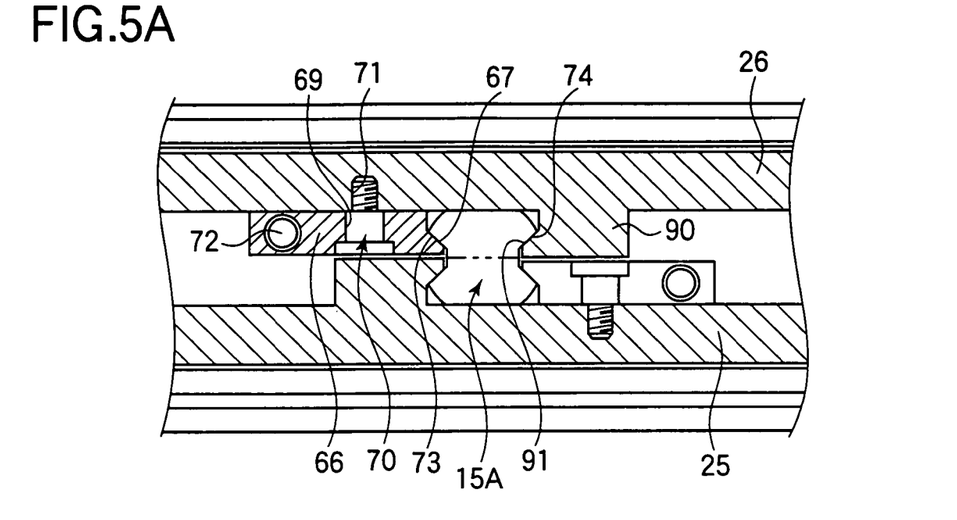
FIG. 5A is an enlarged view of an essential part of FIG. 4B.
Figure 5B:
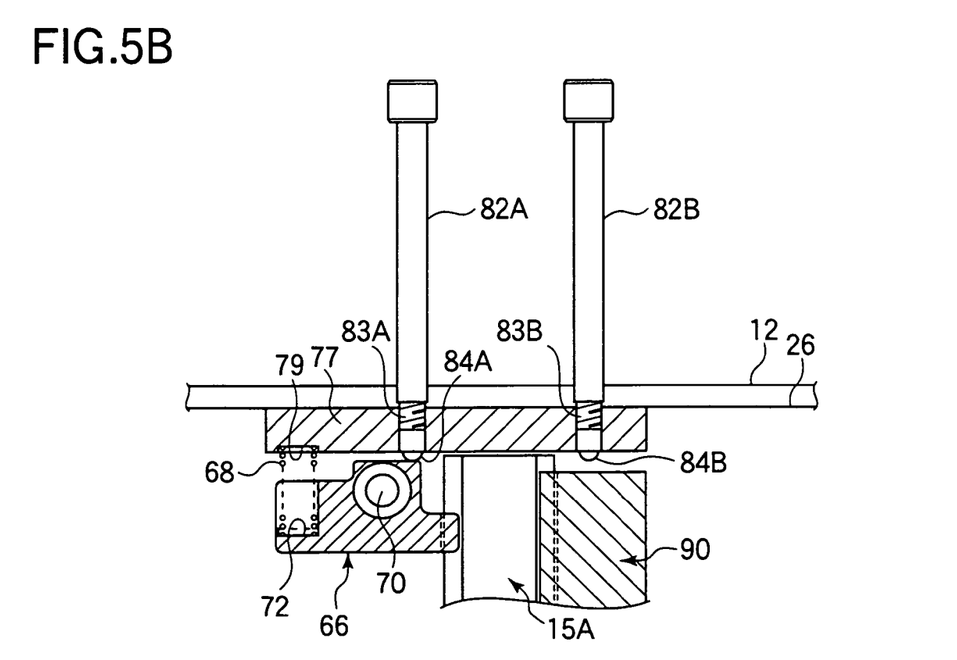
FIG. 5B is an enlarged view of an essential part of FIG. 4C.

The following is a description of unlatching and removing the PC-side valve element 26 in a state where the TC-side valve element 25 is latched to the single shaft 15A and placed in the position for closing the TC opening 13. The rod support member 77 has two internal threads 78A and 78B extending therethrough vertically. External threads 83A and 83B of maintenance rods 82A and 82B prepared separately are inserted into the internal threads 78A and 78B, respectively, from above the rod support member 77 and engaged with the internal threads 78A and 78B. FIG. 5B shows a state where the thread engagement has proceeded to a certain extent. That is, the distal end 84A of the external thread 83A has advanced to abut on the upper end of the forward end portion of the rotary latch 66, and the distal end 84B of the external thread 83B has projected from the lower end surface of the rod support member 77. At this time, step portions of the maintenance rods 82A and 82B at the respective upper ends of the external threads 83A and 83B are located somewhat above the upper end surface of the rod support member 77.

Figure 6A:
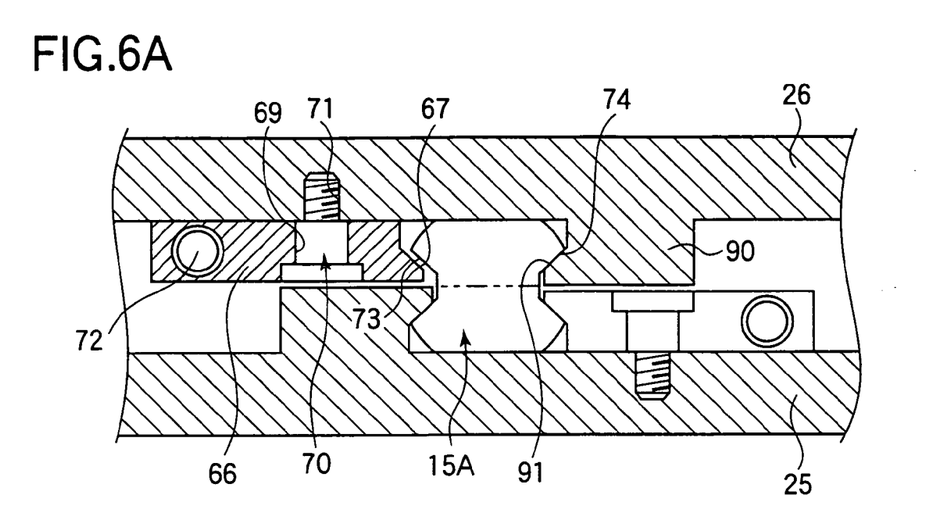
FIG. 6A is an enlarged view corresponding to FIG. 5A, showing an unlatched state.
Figure 6B:
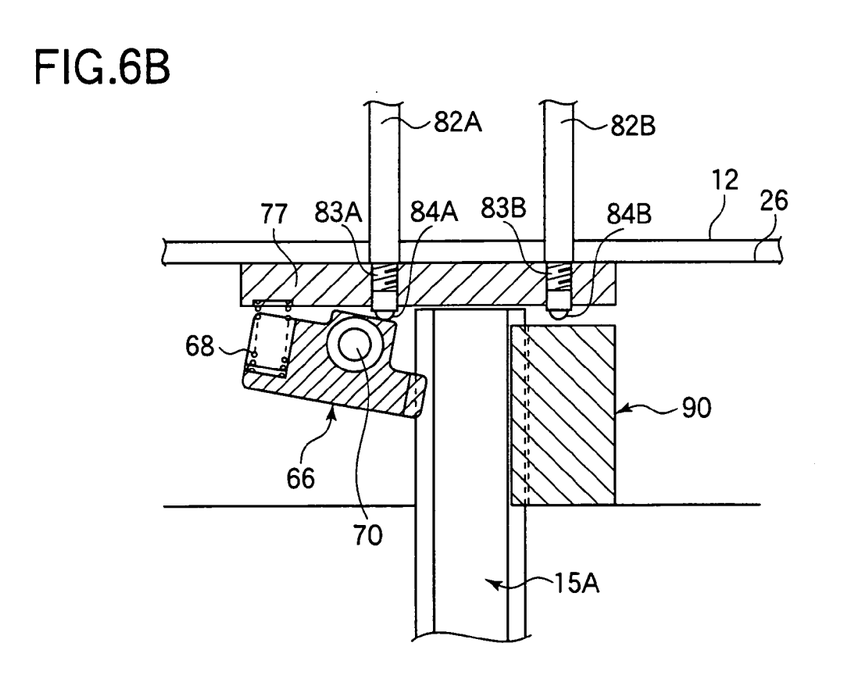
FIG. 6B is an enlarged view corresponding to FIG. 5B, showing an unlatched state.

If the thread engagement of the external threads 83A and 83B is continued to proceed further from the state shown in FIG. 5B, the distal end 84A of the external thread 83A pushes downward the upper end of the forward end portion of the rotary latch 66, causing the rotary latch 66 to rotate clockwise (in a direction opposite to the one direction) against the resilient force of the spring 68 to reach an unlatch position as shown in FIGS. 6A and 6B. At this time, the step portions of the maintenance rods 82A and 82B at the respective upper ends of the external threads 83A and 83B are in contact with the upper end surface of the rod support member 77 to stop the thread engagement from proceeding further. The latch surface 67 of the rotary latch 66 is separated from the joint surface 73 of the single shaft 15A, and the pressing of the retaining surface 91 against the second joint surface 74 is canceled. Thus, the latch between the latch surface 67 and the joint surface 73 is undone. If the maintenance rods 82A and 82B are moved upward by a manual operation in the unlatched state, the PC-side valve element 26 is moved together with the maintenance rods 82A and 82B. In this way, the PC-side valve element 26 can be removed from the valve body 10. Thus, the seal 64 of the PC-side valve element 26 can readily be replaced in a state where the PC-side valve element 26 is out of the valve body 10. The PC-side valve element 26 can be reinstalled by reversing the procedure for removal.

The following is a description of a second example of an arrangement for removing the PC- or TC-side valve element that is not closed when the PC opening 14 or the TC opening 13 is selectively closed, to replace the seal of the valve element, and for reinstalling the valve element after the replacement. The description will be made with reference to FIGS. 7A to 7C. In the example shown in FIGS. 4A to 6B, the spring 68 is used to urge the rotary latch 66 to press the latch surface 67 against the joint surface 73 so as to latch the valve element to a predetermined position, and the maintenance rods 82A and 82B are used to undo the latch between the latch surface 67 and the joint surface 73. In the second example shown in FIGS. 7A to 7C, not a spring but a latch screw 94 is used to urge the rotary latch 66 to press the latch surface 67 against the joint surface 73 in order to latch the valve element to a predetermined position, and an unlatch screw 93 is used to undo the latch between the latch surface 67 and the joint surface 73. Further, the rod support member 77 in FIGS. 7A to 7C has a shorter lateral width than that of the rod support member 77 in FIGS. 4A to 6B. However, it may have the same lateral width as that of the rod support member 77 in FIGS. 4A to 6B. In the following description of the arrangement shown in FIGS. 7A to 7C, members common to the first and second examples are denoted by the same reference numerals as those in FIGS. 4A to 6B, and a description of portions common to the first and second examples will be omitted or made briefly.

Figure 7A:
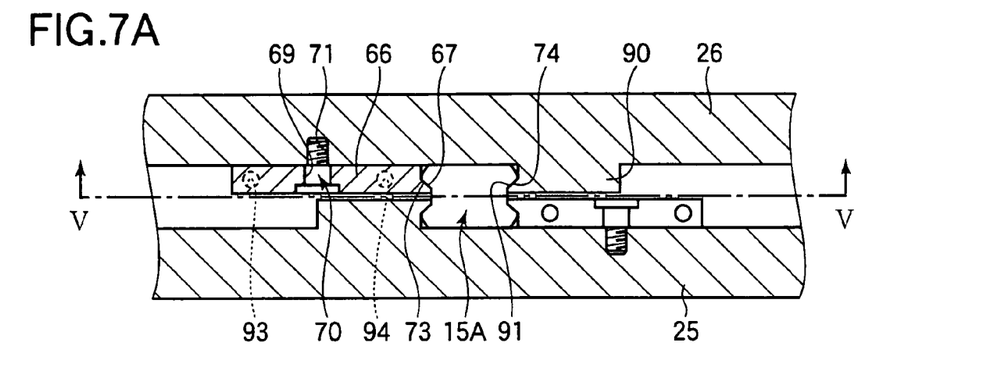
FIG. 7A is a sectional view taken along the line IV—IV in FIG. 7B.
Figure 7B:
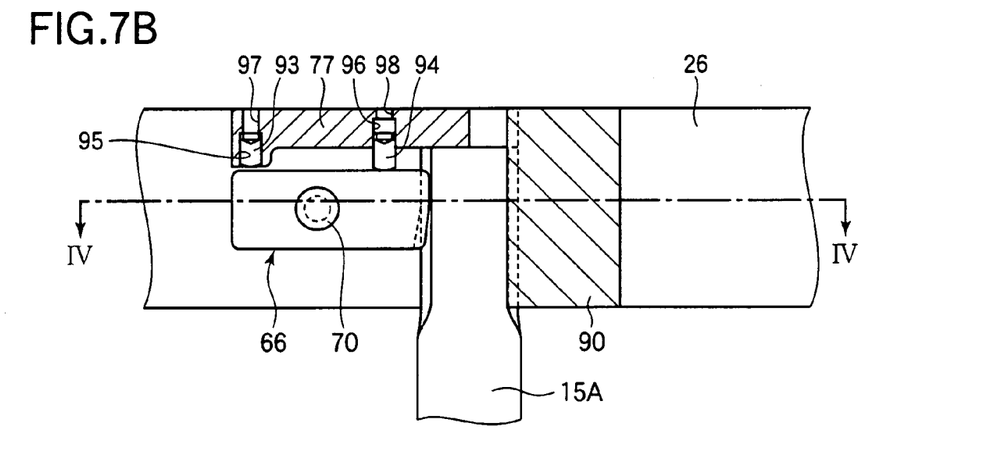
FIG. 7B is a sectional side view taken along the line V—V in FIG. 7A, showing a latched state.
Figure 7C:
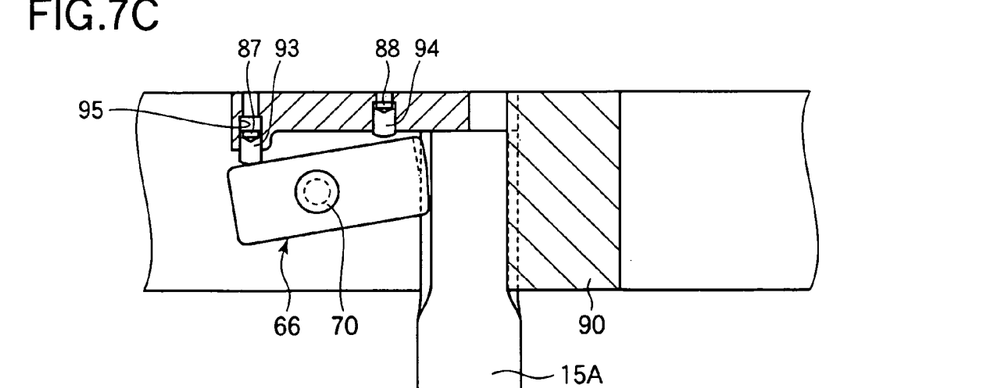
FIG. 7C is a sectional side view corresponding to FIG. 7B, showing an unlatched state.

The rotary latch 66 in FIGS. 7A to 7C is pivotably supported by the same means as in FIGS. 4A to 6B. The insertion hole 69 of the rotary latch 66 is formed at an approximately central position in both the lateral and vertical directions of the rotary latch 66. As shown in FIGS. 7A and 7B, the rotary latch 66 has a predetermined thickness as seen in a top view and is of an approximately rectangular shape that is laterally oblong as seen in a side view. The latch surface 67 is approximately perpendicular to the top surface of the rotary latch 66. The shaft retaining member 90 is provided at the right side of the single shaft 15A. The shaft retaining member 90 extends vertically from the upper end surface to the lower end surface of the PC-side valve element 26. However, the arrangement may be such that the rod support member 77 is extended rightward, and the shaft retaining member 90 is provided on the PC-side valve element 26 at a position below and away from the rod support member 77, as in the case of FIGS. 4A to 4C.

The rod support member 77 above the rotary latch 66 is formed with two pairs of insertion holes 97 and 98 and internal threads 95 and 96. The insertion hole 97 and the internal thread 95 are vertically adjacent to each other, and so are the insertion hole 98 and the internal thread 96. The latch screw 94 is engaged with one internal thread 96 for latching. The unlatch screw 93 is engaged with the other internal thread 95 for unlatching. The latch screw 94 is located above the forward end portion (right end portion in FIG. 7B) of the rotary latch 66. The unlatch screw 93 is located above the rear end portion (left end portion in FIG. 7B) of the rotary latch 66. The head of the latch screw 94 is formed with a cone hexagon socket 88 for engagement. Similarly, the head of the unlatch screw 93 is formed with a cone hexagon socket 87 for engagement. A tool is inserted into the insertion hole 97 and the internal thread 95 or into the insertion hole 98 and the internal thread 96, and the tip of the tool is engaged with the cone hexagon socket 87 or 88. In this state, the tool is turned, thereby allowing the latch screw 94 or the unlatch screw 93 to be rotated to advance or retract.

In the latched state shown in FIGS. 7A and 7B, the latch screw 94 is in an advanced position, and the unlatch screw 93 is in a completely retracted position. The rotary latch 66 has been pivoted in one direction. Consequently, the whole of the latch surface 67 of the rotary latch 66 is pressing the joint surface 73 of the single shaft 15A. Counterforce produced at this time is transmitted to the retaining surface 91 through the rotary latch 66, the rotating shaft 70, the PC-side valve element 26 and the shaft retaining member 90. Accordingly, the whole retaining surface 91 presses the second joint surface 74. Thus, the single shaft 15A is clamped with the latch surface 67 and the retaining surface 91 from both the left and right sides. Hence, latching is surely performed.

If the latch screw 94 is retracted while the unlatch screw 93 is advanced in the latched state shown in FIGS. 7A and 7B, the rotary latch 66 is pivoted counterclockwise (in a direction opposite to the one direction) to reach an unlatched state as shown in FIG. 7C, in which the latch surface 67 is separate from the joint surface 73 of the single shaft 15A. It should be noted that the inner diameters of the insertion holes 97 and 98 are smaller than the outer diameters of the unlatch screw 93 and the latch screw 94. Therefore, there is no possibility of the screws 93 and 94 falling off the rod support member 77 as a result of excessively turning them or during an operation. In a state where the valve element is unlatched, the tip of a hooking tool is engaged with the lower side of the rod support member 77 or the rotary latch 66, and the hooking tool is moved upward, whereby the PC-side valve element 26 can be removed from the valve body 10. The seal 64 of the PC-side valve element 26 can readily be replaced in a state where the PC-side valve element 26 is out of the valve body 10. The PC-side valve element 26 can be reinstalled by reversing the procedure for removal.

It should be noted that the present invention is not necessarily limited to the foregoing embodiments but can be modified in a variety of ways without departing from the gist of the present invention.

What is claimed is:

1. A gate valve including:
    a valve body having a transfer chamber opening and a process chamber opening formed in mutually opposing walls thereof, respectively; and
    a transfer chamber-side valve element and a process chamber-side valve element provided in said valve body, said transfer chamber-side valve element and process chamber-side valve element being connected to a single shaft;
    wherein said transfer chamber-side valve element and said process chamber-side valve element are controlled by actuation of said single shaft so that said transfer chamber-side valve element closes said transfer chamber opening, or said process chamber-side valve element closes said process chamber opening, or both said transfer chamber-side valve element and said process chamber-side valve element fully open said transfer chamber opening and said process chamber opening, respectively, to allow an object to pass therethrough;
    said gate valve comprising:
    a lever member secured to said single shaft;
    a roller supported by said lever member, said roller being kept in engagement with a cam groove of a cam member, said cam groove having a position A, a position B, and a position C;
    a cam support member for supporting said cam member, said cam support member being connected to a piston rod of a three-position air cylinder, said piston rod having a first position, a second position, and a third position; and
    a spring interposed between said lever member and said cam support member;
    wherein when said piston rod is in the first position, said transfer chamber-side valve element and said process chamber-side valve element fully open said transfer chamber opening and said process chamber opening, respectively, and as said piston rod shifts from the first position to the second position, said transfer chamber-side valve element and said process chamber-side valve element half open said transfer chamber opening and said process chamber opening, respectively, and thereafter, said roller shifts from engagement with the position A of said cam groove to engagement with the position B, causing said process chamber-side valve element to close said process chamber opening, and as said piston rod shifts from the second position to the third position, said roller shifts from the engagement with the position B of said cam groove to engagement with the position C, causing said transfer chamber-side valve element to close said transfer chamber opening.

2. A gate valve according to claim 1, wherein a pivot is connected to said lever member, and a pivot-receiving groove is provided on a lower side of said valve body, so that when said roller shifts from the engagement with the position A of said cam groove to the engagement with the position B, and also when said roller shifts from the engagement with the position B of said cam groove to the engagement with the position C, said pivot engages with said pivot-receiving groove to serve as a supporting point for the shifting of said roller.

3. A gate valve according to claim 1 or 2, wherein a grooved plate is connected to said cam member, and a bolt is threaded into said lever member, said bolt having its shank positioned in a yoke groove of said grooved plate.

* * * * *